US012497825B1

(12) United States Patent
Daniels

(10) Patent No.: US 12,497,825 B1
(45) Date of Patent: Dec. 16, 2025

(54) MODULAR WINDOW SHUTTER SYSTEM

(71) Applicant: Jeffrey Daniels, Murfreesboro, TN (US)

(72) Inventor: Jeffrey Daniels, Murfreesboro, TN (US)

( * ) Notice: Subject to any disclaimer, the term of this patent is extended or adjusted under 35 U.S.C. 154(b) by 213 days.

(21) Appl. No.: 18/239,165

(22) Filed: Aug. 29, 2023

(51) Int. Cl.
*E06B 9/02* (2006.01)
*E06B 7/08* (2006.01)
*E06B 7/28* (2006.01)
*E06B 9/04* (2006.01)
*E06B 9/00* (2006.01)

(52) U.S. Cl.
CPC .................. *E06B 9/02* (2013.01); *E06B 7/08* (2013.01); *E06B 7/28* (2013.01); *E06B 9/04* (2013.01); *E06B 2009/005* (2013.01)

(58) Field of Classification Search
CPC ..... E06B 7/08; E06B 7/28; E06B 9/02; E06B 9/04; E06B 2009/00
See application file for complete search history.

(56) References Cited

U.S. PATENT DOCUMENTS 3,341,994 A * 9/1967 Olson ....................... E06B 7/08 52/712
3,886,703 A * 6/1975 Rousey ..................... E06B 9/02 52/473
3,950,904 A * 4/1976 Littman .................... E06B 9/02 52/713
4,444,242 A 4/1984 Amsler
6,269,597 B1 * 8/2001 Haas ......................... E06B 9/02 52/204.67
6,578,664 B1 * 6/2003 Doherty .................... E06C 9/10 49/141
7,650,918 B2 1/2010 Schiedegger
8,302,652 B2 11/2012 Hirsch
8,528,279 B1 * 9/2013 Greene, Jr. ............... E06B 9/01 49/55
9,169,672 B1 * 10/2015 Kislov ...................... E06B 9/02
9,976,343 B1 * 5/2018 Worth ....................... E06B 9/02
D852,383 S 6/2019 Luciani, Jr.
10,597,934 B2 * 3/2020 Gilbert ...................... E06B 9/02
2004/0187417 A1 9/2004 Thomas
2006/0150544 A1 7/2006 Foster
2007/0256373 A1 * 11/2007 Collard ..................... E06B 9/02 52/202
2008/0016798 A1 * 1/2008 Miller ..................... E06B 9/581 52/202
2008/0086959 A1 * 4/2008 McNelis ................... E06B 9/02 52/202

(Continued)

FOREIGN PATENT DOCUMENTS

WO 2008137555 11/2008

*Primary Examiner* — Jessie T Fonseca

(57) ABSTRACT

The modular window shutter system is for use with a window frame. The modular window shutter system forms a shutter that mounts adjacent to the window frame. The modular window shutter system includes a pan structure, a barrier structure, and a plurality of fastening structures. The pan structure secures the modular window shutter system to the support surface, which is adjacent to the window frame. The barrier structure attaches to the pan structure. An initial fastening structure selected from the plurality of fastening structures secures the pan structure to the support surface adjacent to the window frame.

8 Claims, 7 Drawing Sheets

(56) References Cited

U.S. PATENT DOCUMENTS

| | | | | |
|---|---|---|---|---|
| 2008/0313981 | A1 | 12/2008 | Donley | |
| 2010/0064606 | A1 * | 3/2010 | Devalapura | E06B 9/02 52/202 |
| 2013/0160383 | A1 * | 6/2013 | Hedditch | E06B 9/04 52/202 |
| 2013/0269271 | A1 * | 10/2013 | Webb | E06B 9/02 52/698 |
| 2015/0259975 | A1 * | 9/2015 | Helton | E06B 9/0692 160/38 |
| 2017/0213487 | A1 | 7/2017 | Blommel | |
| 2021/0010325 | A1 * | 1/2021 | Roberts | E06B 9/52 |
| 2023/0323674 | A1 * | 10/2023 | Hamel | E04F 13/0803 52/506.05 |
| 2023/0358067 | A1 * | 11/2023 | Meyer | E04H 9/04 |
| 2024/0011599 | A1 * | 1/2024 | Page | F16M 13/02 |

* cited by examiner

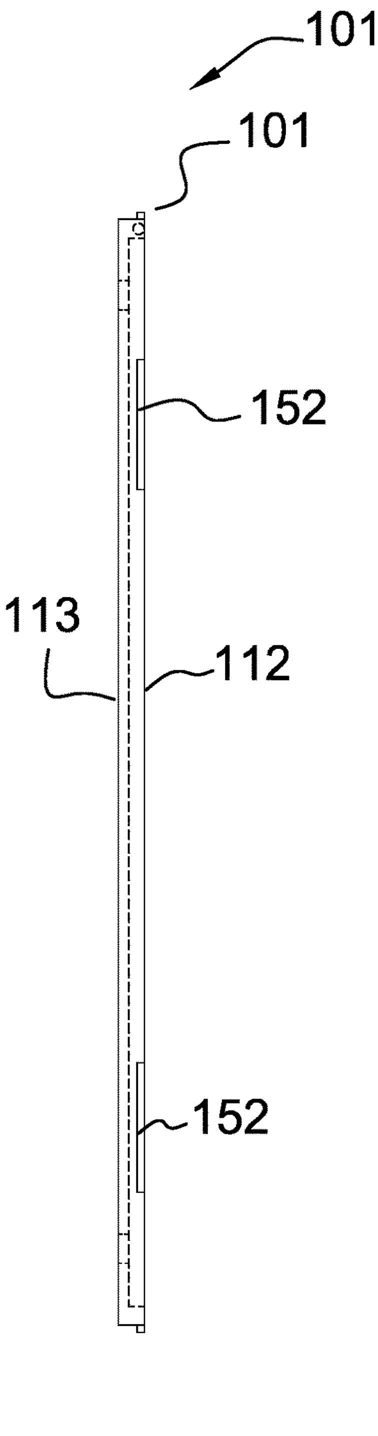
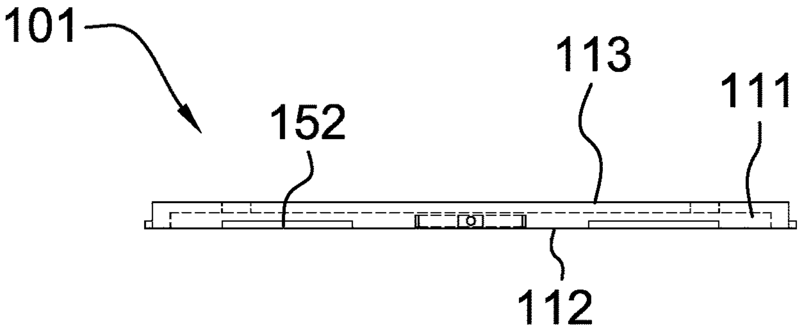
FIG. 4
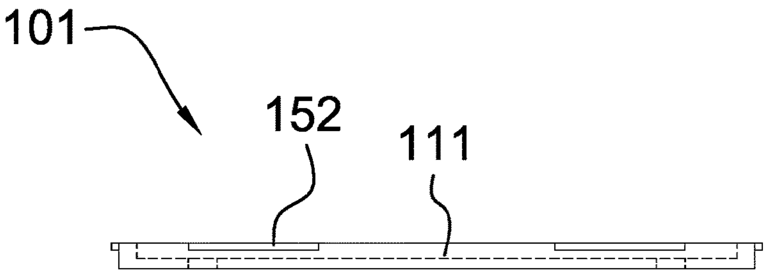
FIG. 5
FIG. 3

MODULAR WINDOW SHUTTER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of louvre doors, windows or grills. (E06B7/08)

SUMMARY OF INVENTION

The modular window shutter system is configured for use with a window frame. The modular window shutter system forms a shutter that mounts on either side of a window frame. The modular window shutter system comprises a pan structure, a barrier structure, and a plurality of fastening structures. The pan structure secures the modular window shutter system adjacent to the window frame. The barrier structure attaches to the pan structure. An initial fastening structure selected from the plurality of fastening structures secures the pan structure adjacent to the window frame. A subsequent fastening structure selected from the plurality of fastening structures secures the barrier structure to the pan structure. The modular window shutter system is an interchangeable window treatment. By interchangeable window treatment is meant that the appearance of the modular window shutter system changes by replacing the barrier structure.

These together with additional objects, features and advantages of the modular window shutter system will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular window shutter system in detail, it is to be understood that the modular window shutter system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular window shutter system.

It is therefore important that the claims be regarded as including such equivalent construction insofar as they do not depart from the spirit and scope of the modular window shutter system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is a side view of an embodiment of the disclosure.

FIG. 4 is a top view of an embodiment of the disclosure.

FIG. 5 is a bottom view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
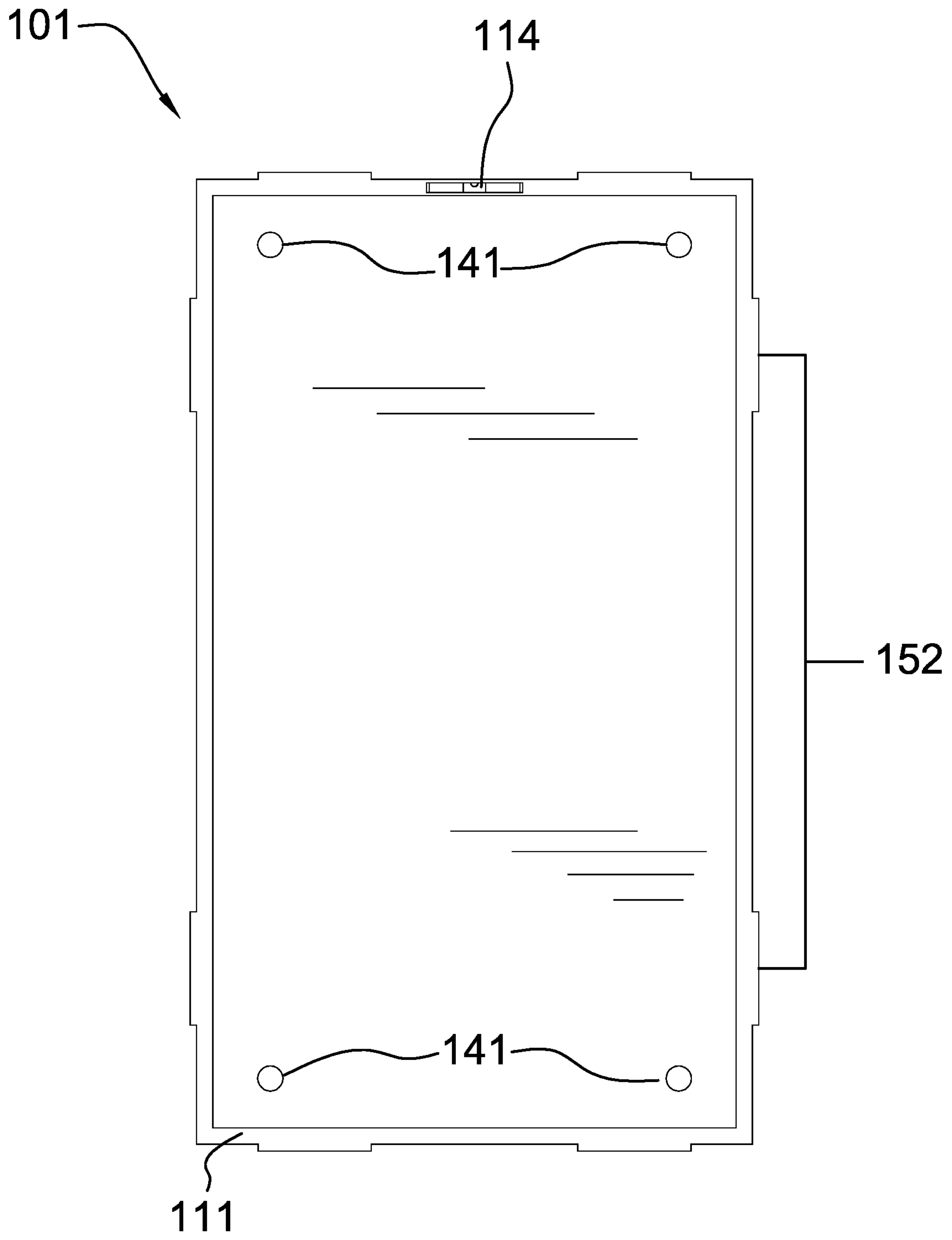
FIG. 1 is a front view of an embodiment of the disclosure.
Figure 2:
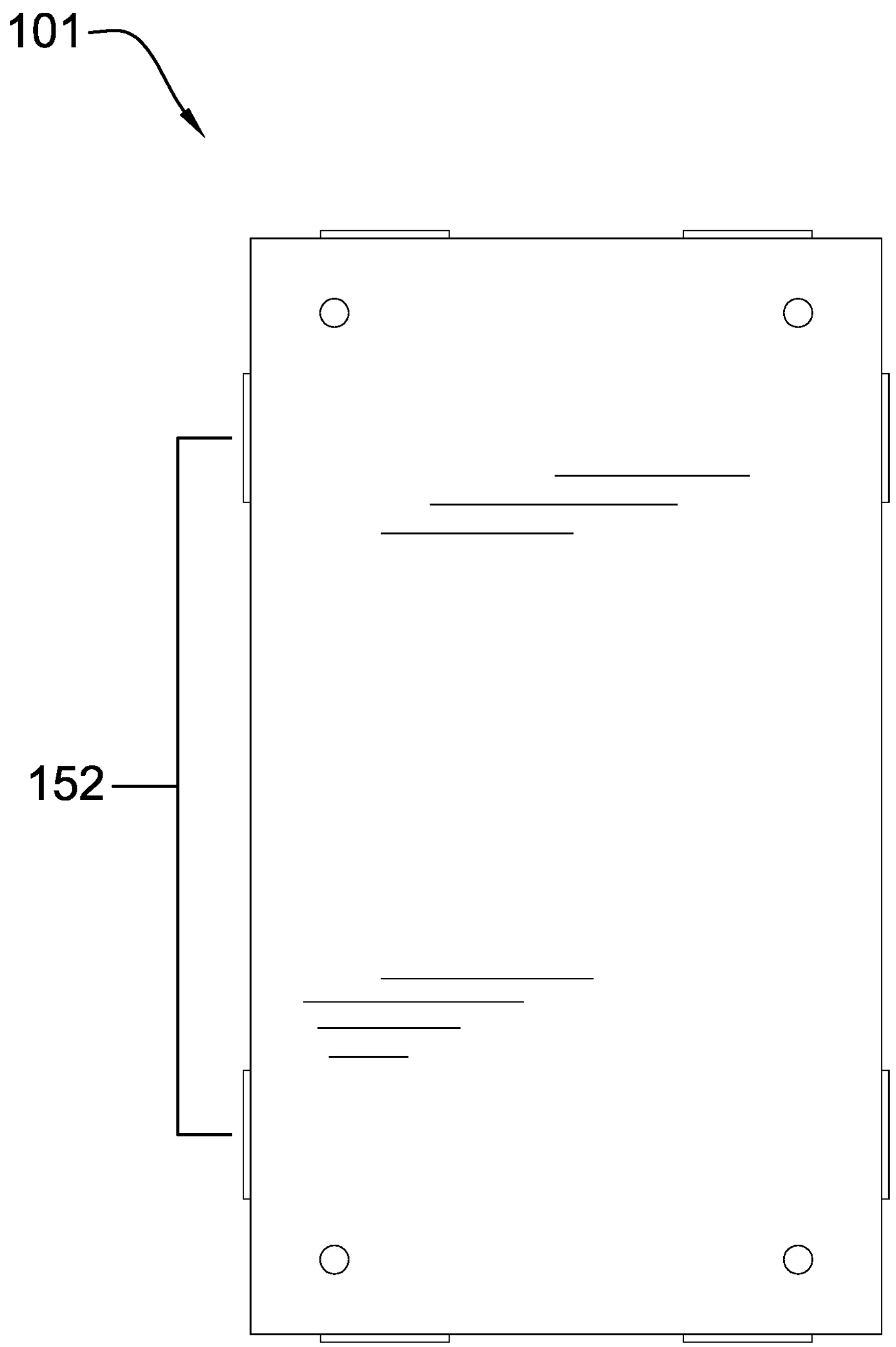
FIG. 2 is a rear view of an embodiment of the disclosure.
Figure 6:
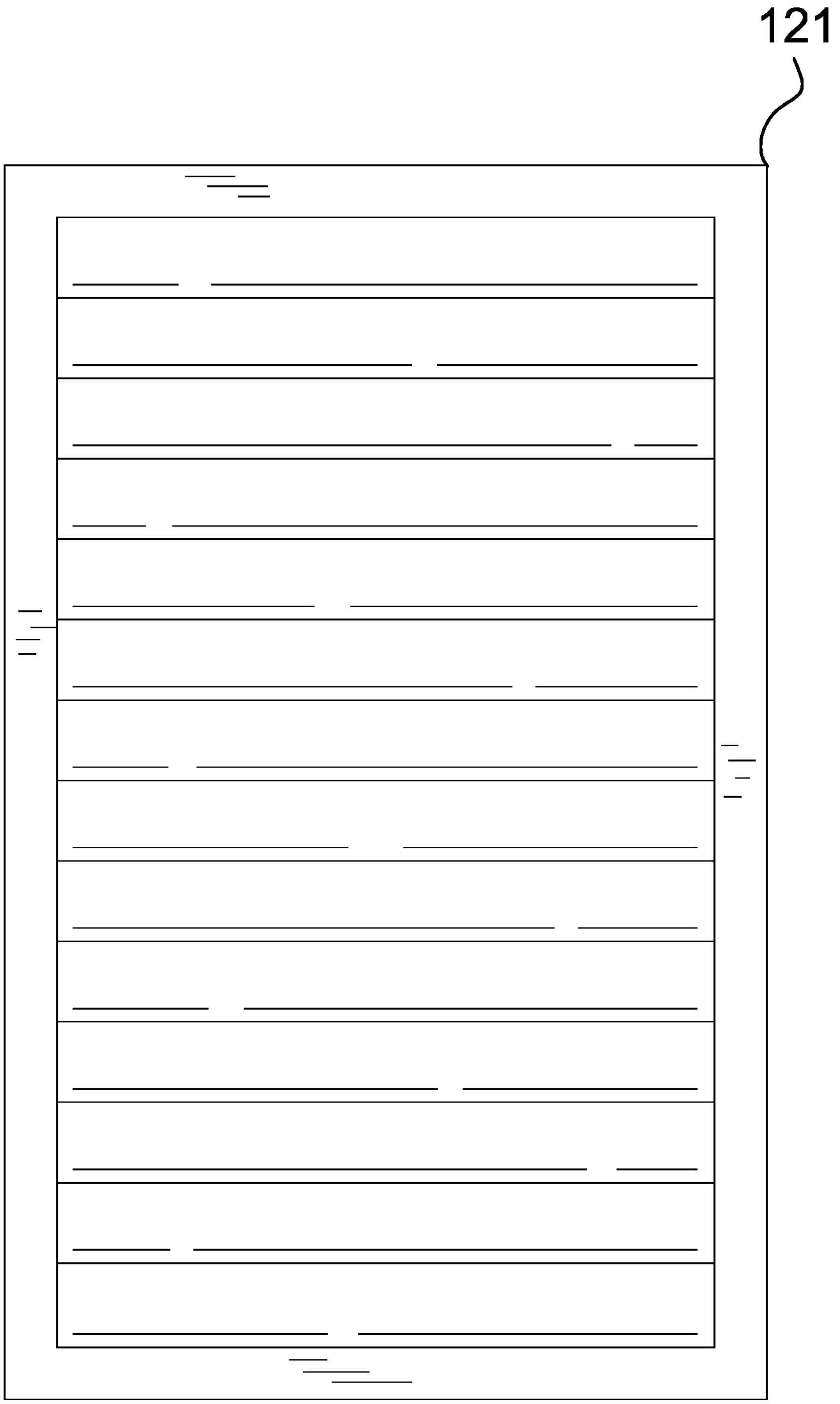
FIG. 6 is a front view of an embodiment of the disclosure.
Figure 7:
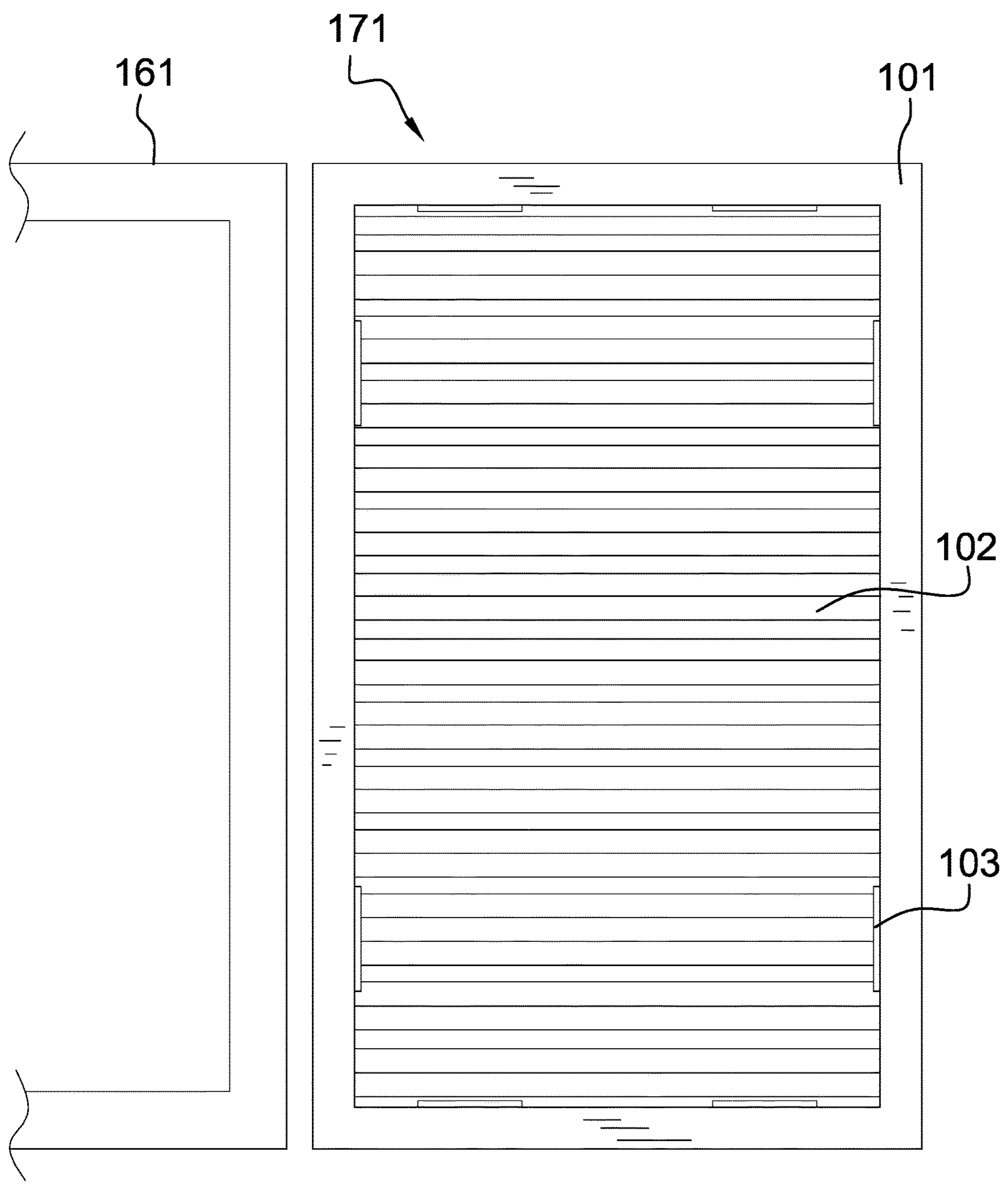
FIG. 7 is a rear view of an embodiment of the disclosure.
Figure 8:
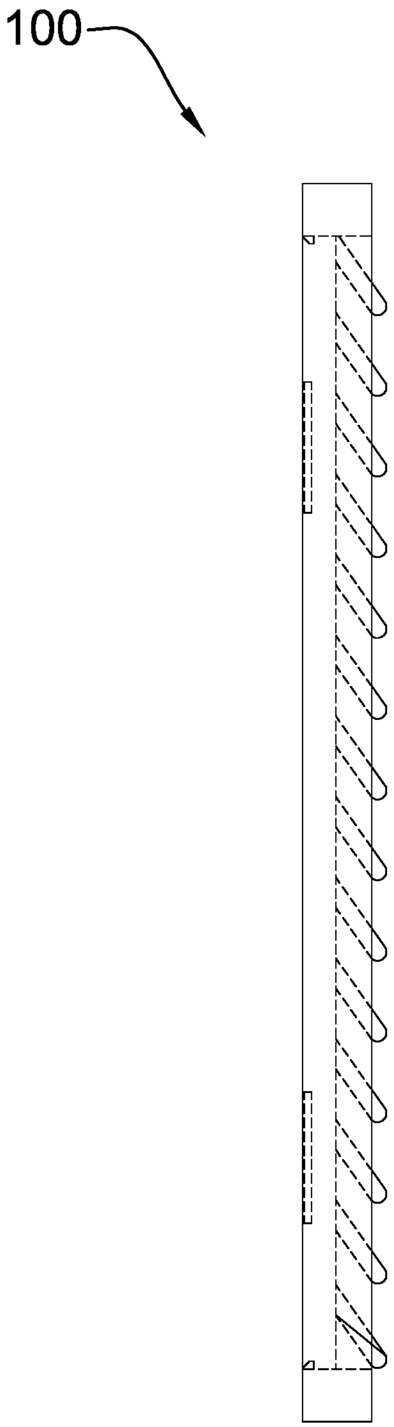
FIG. 8 is an in-use view of an embodiment of the disclosure.
Figure 9:
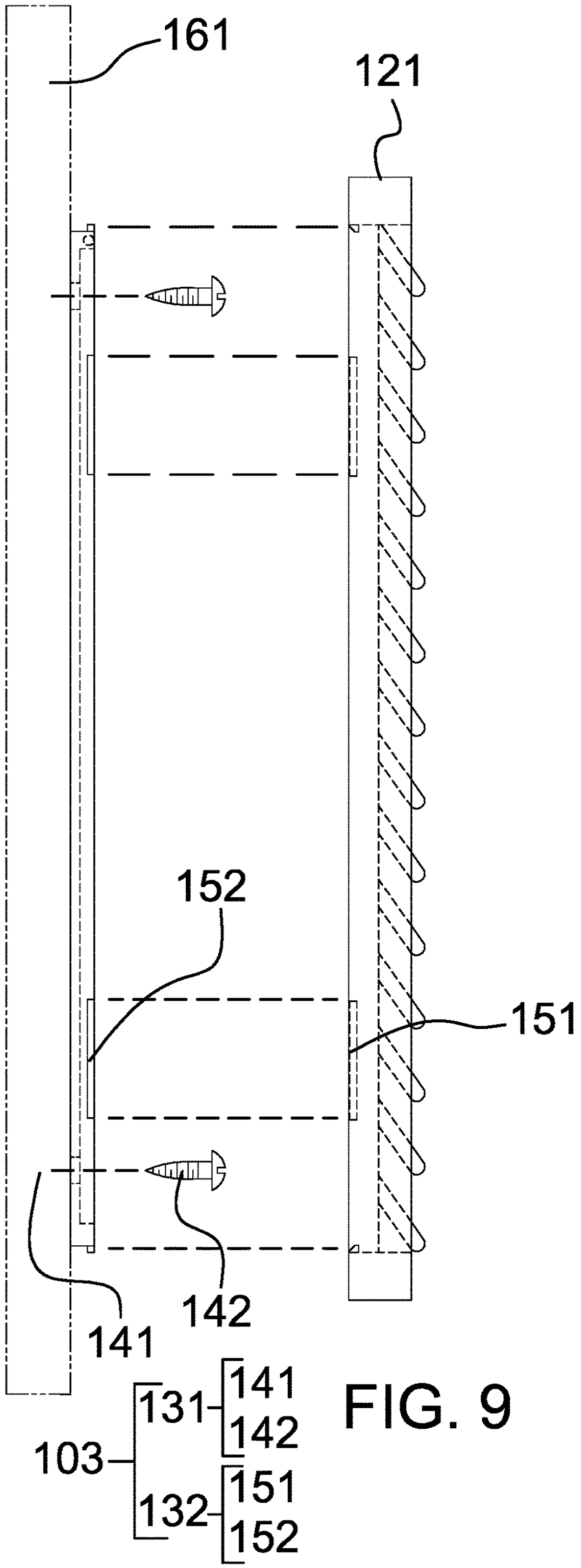
FIG. 9 is an in-use view of an embodiment of the disclosure.
Figure 10:
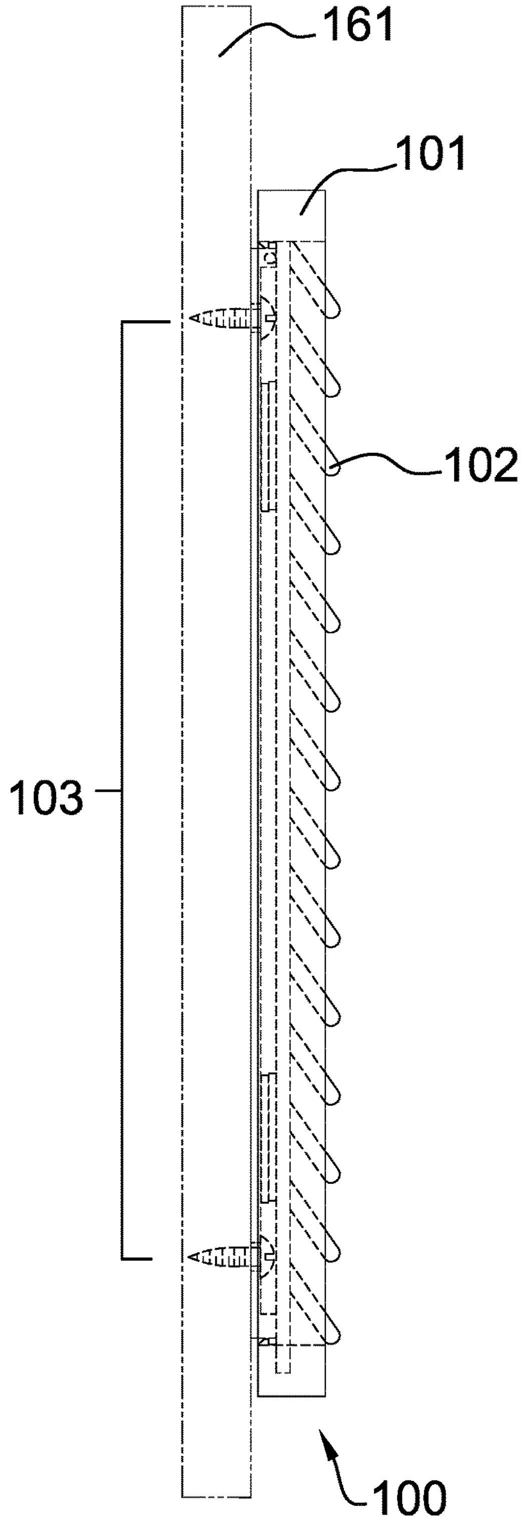
FIG. 10 is an in-use view of an embodiment of the disclosure.

Detailed reference will now be made to one or more potential embodiments of the disclosure, which are illustrated in FIGS. 1 through 10.

The modular window shutter system 100 (hereinafter invention) is configured for use with a window frame 161. Moreover, the invention 100 is configured to be placed adjacent to the window frame 161 to give the appearance of a window shutter on a home.

The invention 100 forms a shutter that mounts adjacent to the window frame 161. The invention 100 comprises a pan structure 101, a barrier structure 102, and a plurality of fastening structures 103. The pan structure 101 secures the invention 100 adjacent to the window frame 161. The barrier structure 102 attaches to the pan structure 101. An initial fastening structure selected from the plurality of fastening structures 103 secures the pan structure 101 to the window frame 161. A subsequent fastening structure selected from the plurality of fastening structures 103 secures the barrier structure 102 to the pan structure 101. The invention 100 is an interchangeable window treatment. By interchangeable window treatment is meant that the appearance of the invention 100 changes by replacing the barrier structure 102.

The pan structure 101 forms a bracket that attaches adjacent to the window frame 161. The pan structure 101 secures the barrier structure 102 adjacent to the window frame 161. The barrier structure 102 removably attaches to the pan structure 101. The pan structure 101 forms a load path that transfers the load of the barrier structure 102 to a support surface 199 that adjacent to the window frame 161. The pan structure 101 permanently attaches to the support surface 199, which is adjacent to the window frame 161.

The pan structure 101 has a disk structure. The pan structure 101 is a hollow structure. The pan structure 101 has a pan shape. The barrier structure 102 attaches to the pan structure 101 by inserting into the hollow interior of the pan structure 101.

The pan structure 101 comprises a perimeter structure 111, an open face 112, and a transparent face 113.

The perimeter structure 111 is a rigid structure. The perimeter structure 111 is the structure of the pan structure that attaches to the support surface 199. The perimeter structure 111 is a disk shaped structure. The perimeter structure 111 is a hollow structure. The perimeter structure forms the lateral face structure of the pan structure 101. The perimeter structure 111 forms the perimeter of the pan structure 101.

The open face 112 forms a congruent end of the disk structure of the pan structure 101. The open face 112 forms the open face 112 of the pan structure 101. The barrier structure 102 inserts into the pan structure 101 through the open face 112. The transparent face 113 forms a congruent end of the disk structure of the pan structure 101.

The transparent face 113 forms the closed face of the pan structure 101. The transparent face 113 is a transparent structure. The transparent face 113 permanently attaches to the perimeter structure 111. The transparent face 113 encloses the tubular structure of the perimeter structure 111.

The perimeter structure 111 further comprises a leveling device 114. The leveling device 114 is a mechanical device. The leveling device 114 permanently attaches to the perimeter structure 111. The leveling device 114 forms a device that ensures that the perimeter structure 111 attaches to the support surface 199 adjacent to the window frame 161 such that the horizontally oriented surfaces of the perimeter structure 111 are perpendicular to the force of gravity. The leveling device is defined elsewhere in this disclosure.

The barrier structure 102 forms a decorative window treatment that enhances the visual appearance of the window frame 161. The barrier structure 102 removably attaches to the pan structure 101. The barrier structure 102 comprises a plurality of interchangeable faces 121.

Each interchangeable face selected from the plurality of interchangeable faces 121 is a disk shaped structure.

Each interchangeable face selected from the plurality of interchangeable faces 121 is interchangeable. By interchangeable is meant that any initial interchangeable face selected from the plurality of interchangeable faces 121 can be replaced with any subsequent interchangeable face selected from the plurality of interchangeable faces 121. Each interchangeable face selected from the plurality of interchangeable faces 121 is a decorative structure. The decorative structure of each selected interchangeable face is used to change the appearance of the window frame 161.

Each interchangeable face selected from the plurality of interchangeable faces 121 is geometrically similar to the open face 112 of the pan structure 101. Each selected interchangeable face is sized such that the selected interchangeable face fits into the open face 112 with a tight fit.

Each fastening structure selected from the plurality of fastening structures 103 is a fastening device. Each fastening structure selected from the plurality of fastening structures 103 forms an attachment selected from the group consisting of: a) the attachment of the pan structure 101 to the support surface 199; and, b) the attachment of the barrier structure 102 to the pan structure 101.

The plurality of fastening structures 103 comprises a collection of fastening structures.

In the first potential embodiment of the disclosure, the plurality of fastening structures 103 comprises a first fastening structure 131 and a second fastening structure 132.

The first fastening structure 131 is a mechanical device. The first fastening structure 131 is a fastening device. The first fastening structure 131 permanently attaches the perimeter structure 111 of the pan structure 101 to the window frame 161.

The second fastening structure 132 is a mechanical device. The second fastening structure 132 is a fastening device. The second fastening structure 132 removably attaches any interchangeable face selected from the plurality of interchangeable faces 121 to the perimeter structure 111 of the pan structure 101.

The first fastening structure 131 further comprises a plurality of magnets 141 and a plurality of screws 142.

Each screw selected from the plurality of screws 142 is a screw. The screw is defined elsewhere in this disclosure. Each screw selected from the plurality of screws 142 screws into the support surface 199.

The second fastening structure 132 further comprises a plurality of exterior clips 151 and a plurality of interior clips 152.

Each exterior clip selected from the plurality of exterior clips 151 is a plate that extends beyond the perimeter of each interchangeable face selected from the plurality of interchangeable faces 121. Each selected exterior clip is sized to match an interior clip selected from the plurality of interior clips 152. Each interior clip selected from the plurality of interior clips 152 is a negative space that is formed on the interior face of the perimeter structure 111 of the pan structure 101. Each selected interior clip is sized to match an exterior clip selected from the plurality of exterior clips 151. By matched is meant that each selected interior clip is sized to receive any exterior clip selected from the plurality of exterior clips 151. The insertion of the plurality of exterior clips 151 into the plurality of interior clips 152 holds any interchangeable face selected from the plurality of interchangeable faces 121 in a fixed position within the perimeter structure 111 with the tight fit.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Boundary Structure: As used in this disclosure, a boundary structure is a barrier that separates a first object from a second object such that the second object cannot damage the first object.

Bracket: As used in this disclosure, a bracket is a mechanical structure that attaches a second structure to a first structure such that the load of the second structure is fully transferred to the first structure.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container. Use protected space or protection space.

Correspond: As used in this disclosure, the term correspond is used as a comparison between two or more objects wherein one or more properties shared by the two or more objects match, agree, or align within acceptable manufacturing tolerances.

Decorative: As used in this disclosure, decorative is an adjective that refers to a first object or item that is used with a second object or item of the purpose of making the second object or item more interesting or attractive. Decorative will generally, but not necessarily, implies making the second object or item more visually attractive.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fitted: As used in this disclosure, the term fitted refers to two geometrically similar structures wherein the smaller geometrically similar structure inserts into the larger geometrically similar structure.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Housing: As used in this disclosure, a housing is a rigid structure that encloses and protects one or more devices.

Interchangeable: As used in this disclosure, interchangeable refers to the ability to remove and replace an element of a structure. For example, if a first object that is attached to a structure can be removed and replaced with a second object selected from a plurality of compatible objects than the first object is said to be interchangeable with both: 1) the second object; and, 2) each of the elements of compatible objects. The term interchangeable is commonly associated with tools. Interchangeable objects are often used to change the function or the performance characteristics of a tool. Replaceable is a synonym for interchangeable.

Interior: As used in this disclosure, the interior is used as a relational term that implies that an object is contained within the boundary of a structure or a space.

Level: As used in this disclosure, the verb to level means to modify the position of a surface relative to the force of gravity such that the surface forms a plane that is aligned: a) parallel to the horizontal direction; and, b) perpendicular to the vertical direction.

Leveling Device: As used in this disclosure, a leveling device is a tool used to identify a plane that is perpendicular to the force of gravity. The leveling device is a transparent cylindrical structure that contains a liquid phase media and a gas phase media. The plane that is perpendicular to the force of gravity is identified by the position of the gas phase media within the liquid phase media.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Louver: As used in this disclosure, a louver is a (generally rectangular) plate that is installed in a vent for the purpose of directing air flow.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Protective Barrier: As used in this disclosure, a protected barrier is a boundary structure. The boundary structure forms a barrier that separates a first object from the environment such that the environment cannot damage the first object.

Screw: As used in this disclosure, a screw is a cylindrical, or tapered cylindrical, structure that is formed with an exterior screw thread. A screw is used to attach a first object to a second object.

Snap: As used in this disclosure, a snap is a fastener that comprises a first component and a second component. The snap is engaged by inserting the first component into the second component.

Tight Fit: As used in this disclosure, a tight fit refers to the insertion of a first object into a second object such that there is not a lot of space between the first object and the second object. By not a lot of space is meant that friction occurs when the first object moves within the second object.

Window: As used in this disclosure, a window is an opening in formed in a structure that is fitted with glass or Window Frame: As used in this disclosure, a window frame is a structure that mounts a window in a structure. The window frame forms the perimeter of the window in the structure. The window frame transfers the load of the window to the structure.

Window Treatment: As used in this disclosure, a window treatment is a structure that is configured for use with a window. The window treatment is used to: a) to control the light that passes through the window; and, b) ensure the privacy within the interior of the structure. A window treatment often acts as a decorative structure that enhances the appearance of the window.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A modular window shutter system, the modular window shutter system comprises a pan structure, a barrier structure, and a plurality of fastening structures;

wherein the pan structure secures the modular window shutter system adjacent to a window frame;

wherein the barrier structure attaches to the pan structure;

wherein a first fastening structure selected from the plurality of fastening structures secures the pan structure to a support surface;

wherein a second fastening structure selected from the plurality of fastening structures secures the barrier structure to the pan structure;

wherein the pan structure comprises a perimeter structure, an open face, and a transparent face;

wherein the perimeter structure is a rigid structure;

wherein the perimeter structure is the structure of the pan structure that attaches to the support surface;

wherein the perimeter structure is a disk shaped structure;

wherein the perimeter structure is a hollow structure;

wherein the perimeter structure forms a lateral face structure of the pan structure;

wherein the open face forms a congruent end of the disk shaped structure of the pan structure;

wherein the transparent face forms the congruent end of the disk shaped structure of the pan structure;

wherein the transparent face forms a closed face of the pan structure;

wherein the transparent face permanently attaches to the perimeter structure;

wherein the transparent face encloses a tubular structure of the perimeter structure.

2. The modular window shutter system according to claim 1, wherein the modular window shutter system forms a shutter that mounts on the support surface, and adjacent to the window frame;

wherein the modular window shutter system is an interchangeable window treatment;

wherein by the interchangeable window treatment is meant that the appearance of the modular window shutter system changes by replacing the barrier structure.

3. The modular window shutter system according to claim 2, wherein the pan structure forms a bracket that attaches to the support surface;

wherein the pan structure secures the barrier structure to the support surface;

wherein the barrier structure removably attaches to the pan structure;

wherein the pan structure forms a load path that transfers the load of the barrier structure to the support surface;

wherein the pan structure permanently attaches to the support surface;

wherein the pan structure has a pan shape;

wherein the barrier structure attaches to the pan structure by inserting into a hollow interior of the pan structure.

4. The modular window shutter system according to claim 3, wherein the barrier structure forms a decorative window treatment that controls the visual appearance of the window frame.

5. The modular window shutter system according to claim 4, wherein the barrier structure comprises a plurality of interchangeable faces;

wherein each interchangeable face selected from the plurality of interchangeable faces is a disk shaped structure.

6. The modular window shutter system according to claim 5, wherein each interchangeable face selected from the plurality of interchangeable faces is geometrically similar to the open face of the pan structure;

wherein each interchangeable face is sized such that the interchangeable face fits into the open face with a tight fit.

7. The modular window shutter system according to claim 6, wherein the plurality of fastening structures comprises a first fastening structure and a second fastening structure;

wherein the first fastening structure is a mechanical device;

wherein the first fastening structure permanently attaches the perimeter structure of the pan structure to the support surface;

wherein the second fastening structure is a mechanical device;

wherein the second fastening structure removably attaches any interchangeable face selected from the plurality of interchangeable faces to the perimeter structure of the pan structure.

8. The modular window shutter system according to claim 7, wherein the perimeter structure further comprises a leveling device;

wherein the leveling device is a mechanical device;

wherein the leveling device permanently attaches to the perimeter structure;

wherein the leveling device forms a device that ensures that the perimeter structure attaches to the window frame such that the horizontally oriented surfaces of the perimeter structure are perpendicular to the force of gravity.

* * * * *